3,489,706
BIS(β-CHLOROETHYL)VINYL PHOSPHONATE
COPOLYMER COMPOSITIONS
Bela K. Mikofalvy, Sheffield Lake, Ohio, assignor to The
B. F. Goodrich Company, New York, N.Y., a corporation of New York
No Drawing. Filed May 16, 1967, Ser. No. 638,775
Int. Cl. C08f 15/40
U.S. Cl. 260—29.6         14 Claims

ABSTRACT OF THE DISCLOSURE

Bis(β-chloroethyl)vinyl phosphonate is interpolymerized with lower alkyl acrylates or methacrylates and acrylic or methacrylic nitriles. The use of bis(β-chloroethyl)vinyl phosphonate with the acrylic ester and acrylic nitrile monomers produces polymers having improved solvent resistance and softness. With increasing amounts of bis(β-chloroethyl)vinyl phosphonate interpolymerized, solvent resistance of the polymers is increased while its glass transition temperature is not increased. The polymers of this invention find application as fabric laminates, flock adhesives and binders for non-woven fabrics.

BACKGROUND OF THE INVENTION

This invention relates to copolymers of bis(β-chloroethyl)vinyl phosphonate and more particularly relates to copolymers of acrylic esters and acrylic nitriles with bis-(β-chloroethyl)vinyl phosphonate and to aqueous dispersions of these water-insoluble copolymers.

Specially formulated acrylic ester polymers are widely used throughout the industry, usually in latex form, as fabric laminates and flock adhesives or binders in non-woven fabric applications. Unless these polymers resist the action of solvents normally employed in dry-cleaning operations they are of little or no value in the above-mentioned applications. In addition to solvent resistance, the polymers must also be soft, in order that the fabric to which the polymer is applied will possess acceptable "hand." Certain monomers, such as butyl acrylate, 2-ethylhexyl acrylate or cellosolve acrylate can be interpolymerized with acrylic ester monomers to give polymers with acceptable glass transition temperatures, however, the solvent resistance of such polymers is generally not acceptable. Typically, the solvent resistance of such polymers decreases as the glass transition temperature is enhanced. Conversely, improving the solvent resistance of acrylic ester polymers by the incorporation of suitable monomers, such as acrylonitrile, will also adversely affect the glass transition temperature of the polymer. I have now discovered, quite unexpectedly, that by copolymerizing bis(β-chloroethyl)vinyl phosphonate with certain acrylic esters and acrylic nitriles, polymers can be obtained wherein the glass transition temperature is not increased while the solvent resistivity of the polymers is improved.

Bis(β-chloroethyl)vinyl phosphonate is known particularly for its ability to impart flame resistance to cellulosic materials such as paper, textiles and wood. U.S. Patent 2,888,434 discloses copolymers useful as drawn filaments or fibers composed essentially of acrylonitrile and bis(β-chloroethyl)vinyl phosphonate.

SUMMARY OF THE INVENTION

This invention provides polymers having excellent resistance to solvents such as perchloroethylene and aqueous dispersions of these polymers by the interpolymerization of acrylic esters and acrylic nitriles with bis(β-chloroethyl)vinyl phosphonate. It is especially important since the high solvent resistivity of these polymers can be achieved without adversely affecting the glass transition temperature of the polymers. The invention is useful since it provides a means whereby, for the first time, a series of acrylic ester polymers can be produced wherein, as the solvent resistance is increased, the glass transition temperature of the polymers is not raised. As a result of this invention, polymer latices can be prepared, which when applied to fabrics, will impart a good "hand" to the fabric. I have found when an acrylic ester, such as the lower alkyl acrylates, and an acrylic nitrile, such as acrylonitrile or methacrylonitrile, are interpolymerized with varying amounts of bis(β-chloroethyl)vinyl phosphonate, the polymers become more resistant to solvents with increasing bis(β-chloroethyl)vinyl phosphonate while the glass transition temperature of the polymers is not raised. Such a technique, capable of improving both the glass transition temperature and the solvent resistance of acrylate based polymers, has been much sought after. It should be noted that this invention is also applicable to acrylate polymers which already have adequate solvent resistance, since bis(β-chloroethyl)vinyl phosphonate can be interpolymerized to lower the glass transition temperature of the polymer without reducing the solvent resistance, and in most cases the solvent resistance will even be improved.

DETAILED DESCRIPTION OF THE INVENTION

The polymer compositions of the present invention will contain varying amounts of bis(β-chloroethyl)vinyl phosphonate, up to about 50% by weight based on total monomers, interpolymerized with acrylic esters and acrylic nitriles. More specifically, the polymers are comprised of greater than 50% by weight of a lower alkyl acrylate or methacrylate and about 2 to 30% by weight of an acrylic or methacrylic nitrile, with about 1 to 50% by weight bis(β-chloroethyl)vinyl phosphonate.

The lower alkyl acrylates employed have the structural formula

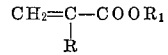

wherein R is a hydrogen or a methyl group and $R_1$ represents an alkyl radical having from 1 to 12 carbon atoms. Representative monomers of the foregoing type include: methyl acrylate, ethyl acrylate, the propyl acrylates and the butyl acrylates, 2-methylhexyl acrylate, n-octyl acrylate, 2-ethylhexyl acrylate, lauryl acrylate, methyl methacrylate, ethyl methacrylate, octyl methacrylate, and the like.

Generally, the acrylic or methacrylic nitriles will be acrylonitrile or methacrylonitrile, however, other polymerizable nitrile containing monomers suitable for imparting oil resistance may also be employed. These include the cyanoalkyl acrylates such as cyanomethyl acrylate, alpha-cyanoethyl acrylate, beta-cyanoethyl acrylate, gamma-cyanopropyl acrylate, dicyanopropyl acrylate, and the like.

The polymers of this invention will generally contain greater than 50% by weight of the lower alkyl acrylate and more preferably about 60 to 85% by weight of the lower alkyl acrylate with about 2 to 30% by weight, and preferably 5 to 20% by weight of the acrylic or methacrylic nitrile. The amount of bis(β-chloroethyl)vinyl phosphonate interpolymerized therewith will vary between about 1 to 50% by weight, however, excellent results have been obtained when about 3 to 30% by weight bis(β-chloroethyl)vinyl phosphonate is employed.

In addition to the above-mentioned monomers, one or more other polymerizable monomers, preferably vinylidene type monomers containing the $CH_2=C<$ grouping, may also be interpolymerized. Such polymerizable monomers may include conjugated dienes such as butadiene and isoprene; alpha-olefins such as ethylene, propylene, butene-2, and isobutylene; vinyl halides such as vinyl chloride, vinyl fluoride and vinylidene chloride; vinyl esters such as vinyl acetate; vinyl aromatics such as styrene, alpha-methyl styrene, vinyl toluene and vinyl naphthalene; alkyl vinyl ethers such as methyl vinyl ether, isobutyl vinyl ether, n-butyl vinyl ether, and isobutyl vinyl ether; N-alkylol amides such as N-methylol acrylamide, N-ethanol acrylamide, N-propanol acrylamide, N-methylol methacrylamide, N-ethanol methacrylamide and N-methylol-p-vinyl benzoamide; acrylic acid, alpha-chloroacrylic acid, alpha-cyanoacrylic acid, methacrylic acid, ethacrylic acid, beta-acryloxy propionic acid, itaconic acid, acrylamide, methacrylamide, N-isopropyl acrylamide, N-isobutyl methacrylamide, N-tert-butyl acrylamide, N-tert-butyl methacrylamide, and the like. When such polymerizable comonomers are used, they may constitute up to as much as 40% by weight of the polymer, however, it is generally preferred that they not exceed about 25% by weight.

Small amounts of difunctional or polyfunctional compounds such as methylene-bis-acrylamide, ethylene glycol dimethacrylate, diethylene glycol diacrylate, divinyl benzene and the like, may also be polymerized with the lower alkyl acrylate/acrylic nitrile and bis($\beta$-chloroethyl)vinyl phosphonate. Such polyfunctional monomers are useful to cross-link the polymers of this invention if so desired.

Conventional polymerization techniques may be employed to prepare the polymers of this invention, however, the polymers are usually prepared in an aqueous medium. The aqueous medium may be mulsifier-free or it may contain an emulsifying agent. The amount of emulsifier used may range up to about 6% or more by weight based on the total monomers. The emulsifier may be charged at the beginning of the polymerization or it may be added incrementally or by proportioning throughout the polymerization.

When an emulsifier is used, it may be any of the general types of anionic, cationic or non-ionic emulsifiers. Excellent results have been obtained when anionic emulsifiers have been used to prepare the polymers. Typical anionic emulsifiers which may be used include the alkali metal or ammonium salts of alcohols having from 8 to 18 carbon atoms such as sodium lauryl sulfate; ethanolamine lauryl sulfate, ethylamine lauryl sulfate; alkali metal and ammonium salts of sulfonated petroleum or paraffin oils; sodium salts of aromatic sulfonic acids such as dodecane-1-sulfonic acid and octadiene-1-sulfonic acid; aralkyl sulfonates such as sodium isopropyl benzene sulfonate, sodium dodecyl benzene sulfonate, sodium isobutyl naphthalene sulfonate; alkali metal and ammonium salt of sulfonated dicarboxylic acid esters such as sodium dioctyl sulfosuccinate, disodium-N-octadecyl sulfosuccinamate; alkali metal or ammonium salts of free acids of complex organic mono- and diphosphate esters and the like. Useful cationic emulsifiers include the salts of strong inorganic acids and organic bases containing long carbon chains such as lauryl amine hydrochloride, diethylaminoethyl, decylamine hydrochloride, trimethyl cetyl ammonium bromide, dodecyl trimethyl ammonium bromide and the like. So-called nonionic emulsifiers such as octyl- or nonylphenyl polyethoxyethanol and the like, may also be used. In addition to the above-mentioned emplsifiers, it may be desirable to add post-polymerization emulsifiers to the polymer latices of this invention to improve the latex stability. Such post-polymerization emulsifiers may be the same as, or different than, the emulsifier employed to carry out the polymerization.

Free radical initiators are employed as catalysts to prepare the polymers of this invention. The use of a catalyst insures a uniform and controlled polymerization and a satisfactory polymerization rate. Commonly used free radical initiators include various peroxygen compounds such as the persulfates, benzoyl peroxide, t-butyl hydroperoxide, cumene hydroperoxide, t-butyl diperphthalate, pelargonyl peroxide and 1-hydroxycyclohexyl hydroperoxide, azo compounds such as azodiisobutyronitrile and dimethyl azodiisobutyrate; and the like. Especially useful polymerization initiators for the polymers of the present invention are the water soluble peroxygen compounds such as hydrogen peroxide and the sodium, potassium and ammonium persulfates. The sodium, potassium or ammonium persulfates may be employed by themselves or in activated "redox" systems. Typical "redox" systems include alkali metal persulfates with: a reducing substance such as a polyhydroxy phenol and an oxidizable sulfur compound such as sodium sulfite, sodium bisulfite or sodium formaldehyde sulfoxylate, a reducing sugar, a diazomercapto compound, a ferricyanide compound, dimethylamino propionitrile, or the like. Heavy metal ions such as silver, cupric, iron, cobalt, nickel and others, may also be used to activate the persulfate catalyzed polymerization. In general, the amount of initiator used can range between about 0.1 to 5% by weight based on monomers. The initiator generally is completely charged at the outset of the polymerization, however, incremental addition or proportioning of the initiator throughout the polymerization can be employed if desired.

In conducting the polymerization for the preparation of the acrylate polymers of the present invention, the monomers are charged or proportioned into the polymerization reactor which contains water, emulsifying agent and polymerization initiator. The temperature at which the polymerization is carried out is not critical and may be varied in the range of about $-30°$ C. to 100° C. or higher. Best results have been obtained within the temperature range of 0° C. to 90° C. While the pH of the polymerization is not critical it is generally preferred that a pH of about 8 or below be employed to minimize hydrolysis of the acrylic esters. Following the polymerization it may be desirable to adjust the pH of the polymer latex. Polymerization modifiers such as primary, secondary and tertiary mercaptans may be advantageously employed in conducting the polymerization. Other compounds such as buffers, electrolyte salts, carbon black or the like may also be included while conducting the polymerization. The polymerization may be conducted in the presence of air, however, the polymerization rate is normally faster in the absence of oxygen, and for this reason it is preferred that the polymerization be conducted under an inert atmosphere such as nitrogen, at reflux or in an evacuated vessel. The polymerization may be terminated by the addition of a polymerization inhibitor such as hydroquinone or phenyl beta-naphthylamine. Such techniques have been described in the literature and are well-known to those skilled in the art.

It is often desirable to incorporate a small amount of a stabilizer or antioxidant into the latex to protect it from the deleterious effects of oxygen. Compounds such as hindered phenols, diarylamines and the like, in amounts from about 0.1 to 5% by weight, are generally employed for this purpose.

The polymer latices of the present invention find application as fabric laminates, as binders for non-woven fabrics and as flock adhesives. The polymer latices may be used as obtained from the polymerization, they may be diluted to lower solids content or they may be blended with other latices. It may also be advantageous to blend these latices with thickening agents such as water soluble salts of polyacrylic acid and polymethacrylic acid, copolymers of these acids with lower alkyl acrylates, natural gums such as alginates, proteins such as casein or cellulose derivatives such as hydroxyethyl cellulose.

While the polymer latices of this invention are useful in the above-mentioned applications, the polymers themselves may be isolated by conventional means such as coagulation with alcohol, acid solutions or salt solutions or freeze agglomeration, and used in a variety of other applications.

The following examples illustrate the invention more fully, however, they are not intended as a limitation of the scope thereof. All parts and percentages are on a weight basis unless noted otherwise.

Example I

A series of five polymer latices were prepared in accordance with the following recipe:

| | Parts |
|---|---|
| Ethyl acrylate | 80–55 |
| Acrylonitrile | 20 |
| Bis(β-chloroethyl)vinyl phosphonate | 0–25 |
| Water | 98 |
| Anionic emulsifier [1] | 4 |
| Ammonium persulfate | 0.35 |
| Ammonium carbonate | 0.04 |

[1] A mixture of alkali metal salts of cetyl polyethoxy sulfate and stearyl polyethoxy sulfate.

The polymerization vessel equipped with an agitator was charged with about 63 parts of water containing the ammonium carbonate and about 5–15% of a premixed emulsion containing 30 parts water, the emulsifier and the monomers. The reactor and its contents were then heated to about 60–70° C. by the application of external heat and the ammonium persulfate initiator dissolved in 1 part water was charged. The remainder of the monomer premix was proportioned into the reactor over a period of about one hour while maintaining the temperature at about 80° C. and with continuous stirring. At the completion of the charge, the polymerization was maintained for an additional hour at 80° C. to insure a conversion greater than 90%. The resulting fluid latices contained about 48–50% total solids with less than 0.1% coagulum based on the total polymer formed. The latices had excellent stability and low coagulum.

Table A shows the five polymer latices, giving the parts ethyl acrylate and bis(β-chloroethyl)vinyl phosphonate, the percent swell of the polymer in perchloroethylene and the glass transition temperature of the polymer. In each case, the acrylonitrile remained constant at 20 parts. The percent swell was determined by casting a film of the polymer on a glass plate using a 15 mil. applicator. The film was allowed to dry at room temperature, removed from the glass plate and a 1″ x 1″ test specimen cut. The test specimen was then soaked in perchloroethylene at room temperature and the percent swell determined according to the following equation:

$$\frac{\text{Increased area of the specimen}}{\text{original area}} \times 100 = \text{percent swell}$$

Glass transition temperature ($T_g$) data was obtained by differential thermal analysis at a heating rate of 1° C./min. The inflection point on the curve was taken as the glass transition temperature.

TABLE A

| | $T_g$ (° C.) | Percent Swell in Perchloroethylene | |
|---|---|---|---|
| | | 30 Minutes | 45 Minutes |
| 80 Ethyl acrylate | 11 | 32 | ([1]) |
| 75 Ethyl acrylate/5 bis(β-chloroethyl)vinyl phosphonate | 10 | 32 | 83 |
| 65 Ethyl acrylate/15 bis(β-chloroethyl)vinyl phosphonate | 4 | 21 | 45 |
| 55 Ethyl acrylate/25 bis(β-chloroethyl)vinyl phosphonate | −3 | 10 | 21 |

[1] Polymer partially dissolved.

Example II

The procedure of Example I was followed to prepare ethyl acrylate/acrylonitrile/acrylic acid/N-methylol acrylamide copolymers suitable as non-woven binders, wherein varying amounts of the ethyl acrylate was replaced with bis(β-chloroethyl)vinyl phosphonate. The polymerization recipe was as follows:

| | Parts |
|---|---|
| Ethyl acrylate | 94–79 |
| Acrylonitrile | 3 |
| Acrylic acid | 1.2 |
| N-methylol acrylamide | 1.8 |
| Bis(β-chloroethyl)vinyl phosphonate | 0–15 |
| Water | 98 |
| Sodium lauryl sulfate | 1.8 |
| Ammonium persulfate | 0.24 |
| Ammonium carbonate | 0.33 |
| Ammonium hydroxide | 0.25 |

The ammonium hydroxide was added to the resulting latex to adjust the pH. The percent swell after 45 minutes in perchloroethylene and glass transition temperatures of resulting polymers were determined and the results are set forth below in Table B.

TABLE B

| | $T_g$ (° C.) | Percent Swell in Perchloroethylene |
|---|---|---|
| 94 Ethyl acrylate | −12 | 96 |
| 89 Ethyl acrylate/5 bis(β-chloroethyl)vinyl phosphonate | −12 | 44 |
| 79 Ethyl acrylate/15 bis(β-chloroethyl)vinyl phosphonate | −15 | 43 |

Example III n-Butyl acrylate/acrylonitrile/N-methylol acrylamide/acrylamide copolymer latices were prepared with varying amounts of bis(β-chloroethyl)vinyl phosphonate in accordance with the procedure of Example I. Copolymers of this type find applications as adhesives in flocking operations. The polymerization recipe employed was as follows:

| | Parts |
|---|---|
| n-Butyl acrylate | 83.5–58.5 |
| Acrylonitrile | 12 |
| N-methylol acrylamide | 1 |
| Acrylamide | 3.5 |
| Bis(β-chloroethyl)vinyl phosphonate | 0–25 |
| Water | 98 |
| Sodium lauryl sulfate | 0.5 |
| Ammonium persulfate | 0.22 |
| An emulsion of an alkylated phenol | 0.5 |

Table C sets forth the results obtained for these polymers.

TABLE C

| | $T_g$ (° C.) | Percent Swell in Perchloroethylene |
|---|---|---|
| 83.5 n-Butyl acrylate | −23 | 170 |
| 78.5 n-Butyl acrylate/5 bis(β-chloroethyl)vinyl phosphonate | −25 | 140 |
| 73.5 n-Butyl acrylate/10 bis(β-chloroethyl)vinyl phosphonate | −28 | 125 |
| 68.5 n-Butyl acrylate/15 bis(β-chloroethyl)vinyl phosphonate | −29 | 124 |
| 58.5 n-Butyl acrylate/25 bis(β-chloroethyl)vinyl phosphonate | −39 | 96 |

Examples IV–VI

To demonstrate the versatility of the present invention, the procedure employed in Example I was repeated, using other lower alkyl acrylates and methacrylates. The recipe employed was 0.5 part sodium lauryl sulfate, 0.22 part ammonium persulfate and 97 parts water.

The monomer compositions of the polymers were as follows:

| | Parts | | |
|---|---|---|---|
| | Ex. IV | Ex. V | Ex. VI |
| 2-ethylhexyl acrylate | 83.5–68.5 | | |
| Butyl methacrylate | | 83.5–68.5 | |
| Ethyl methacrylate | | | 83.5–68.5 |
| Acrylonitrile | 12 | 12 | 12 |
| N-methylol acrylamide | 1 | 1 | 1 |
| Acrylamide | 3.5 | 3.5 | 3.5 |
| Bis($\beta$-chloroethyl)vinyl phosphonate | 0–15 | 0–15 | 0–15 |

In all three examples the polymers showed improved glass transition temperatures and better solvent resistance as the amount of bis($\beta$-chloroethyl)vinyl phosphonate was increased. With 2-ethylhexyl acrylate, for example, the percent swell in perchloroethylene was reduced from 260% to 155% by the addition of 5 parts bis($\beta$-chloroethyl)vinyl phosphonate, while the glass transition temperature was lowered 1° C. By interpolymerizing 5 parts bis($\beta$-chloroethyl)vinyl phosphonate with the butyl methacrylate copolymer, the glass transition temperature was lowered from 28° C. to 18° C. with a 24% increase in the solvent resistance. At 15 parts bis($\beta$-chloroethyl)vinyl phosphonate, the glass transition temperature of the polymer was 3° C. The ethyl methacrylate polymers of Example VI similarly showed improved resistance to perchloroethylene with lowering of the glass transition temperature from 63° C. to 20° C. when up to 15 parts bis($\beta$-chloroethyl)vinyl phosphonate were interpolymerized.

Example VII

In a similar manner, styrene was copolymerized with the acrylate monomers according to the following recipe:

| | Parts | |
|---|---|---|
| | A | B |
| Ethyl acrylate | 73 | 63 |
| Acrylonitrile | 5 | 5 |
| Styrene | 20 | 20 |
| N-methylol acrylamide | 1 | 1 |
| Acrylamide | 1 | 1 |
| Bis($\beta$-chloroethyl)vinyl phosphonate | | 10 |
| Sodium lauryl sulfate | 0.5 | 0.5 |
| Ammonium persulfate | 0.22 | 0.22 |
| Water | 98 | 98 |

Polymer A had a glass transition temperature of 14° C. and was partially dissolved after 30 minutes at room temperature in perchloroethylene. Polymer B, containing 10 parts bis($\beta$-chloroethyl)vinyl phosphonate, had a glass transition temperature of 12° C. and showed only 125% swell in perchloroethylene after 30 minutes.

Example VIII

To demonstrate the utility of the polymer latices of the present invention, the n-butyl acrylate/acrylonitrile/N-methylol acrylamide/acrylamide copolymers of Example III were thickened to about 15,000–25,000 cps. (as determined with a Brookfield RVF Viscometer at 20 r.p.m.) by the addition of a high molecular weight copolymer of acrylic acid and about 1% by weight polyallyl sucrose. The thickened latices were then applied to cotton print cloth with a 10 mil applicator and 0.030 mil rayon fibers embedded into the adhesive coating by the application of 50,000 volts for 10 minutes. The flocked samples were dried for 10 minutes at 212° F. and then cured at 275° F. for 15 minutes. Samples of the flocked material were then dry-cleaned (AATCC–86–1863T) and washed (AATCC–61–1965IIA) repeatedly to test their durability. Visual examination of the flocked material revealed that in both the dry-cleaning and washing tests, the samples prepared from copolymers which contained bis($\beta$-chloroethyl)vinyl phosphonate had a better appearance (i.e. less flock was lost) than the control. The low temperature flex of the samples were measured in accordance with Federal Specification CCC–7–191B Method 5206 and found to be significantly improved in the samples prepared from copolymers containing larger amounts of bis($\beta$-chloroethyl)vinyl phosphonate.

It is evident from the examples set forth above that the present invention provides a means for improving the solvent resistance of acrylic ester/acrylic nitrile copolymers without increasing the glass transition temperature of the polymers, by interpolymerizing bis($\beta$-chloroethyl) vinyl phosphonate with the acrylic ester and acrylic nitrile monomers. In addition to the above-mentioned monomers, other polymerizable vinylidene monomers may be interpolymerized therewith, to produce a wide variety of useful polymers and polymer latices. The polymers have been found to be particularly useful in latex form as fabric laminates, flock adhesives, binders for paper and in non-woven fabric applications.

I claim:
1. Solvent-resistant addition copolymers having glass transition temperatures no greater than about 20° C. comprising greater than 50% by weight based on total monomers of at least one lower alkyl acrylate having the structural formula

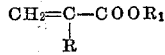

wherein R is a hydrogen or a methyl group and $R_1$ represents an alkyl radical having from 1 to 12 carbon atoms; about 2 to 30% by weight of an acrylic or methacrylic nitrile; and about 1 to 50% by weight bis($\beta$-chloroethyl) vinyl phosphonate, interpolymerized together.

2. A polymer of claim 1, containing up to about 40% by weight of one or more other vinylidene monomers.

3. A polymer of claim 2, wherein the lower alkyl acrylate is ethyl acrylate or ethyl methacrylate, n-butyl acrylate or n-butyl methacrylate, or 2-ethylhexyl acrylate or 2-ethylhexyl methacrylate.

4. A polymer of claim 2, wherein the acrylic or methacrylic nitrile is acrylonitrile or methacrylonitrile.

5. A polymer of claim 2, wherein the vinylidene monomers are styrene, vinyl acetate, acrylamide, N-methylol acrylamide, acrylic acid or methacrylic acid.

6. A polymer of claim 1, which contains about 60 to 85% by weight of the lower alkyl acrylate, about 5 to 20% by weight of the acrylic or methacrylic nitrile and about 3 to 30% by weight bis($\beta$-chloroethyl) vinyl phosphonate.

7. A polymer of claim 6, wherein the acrylic nitrile is acrylonitrile and which contains less than about 25% by weight acrylamide or N-methylolacrylamide.

8. A polymer of claim 7, wherein the lower alkyl acrylate is ethyl acrylate or ethyl methacrylate, n-butyl acrylate or n-butyl methacrylate, or 2-ethylhexyl acrylate or 2-ethylhexylmethacrylate.

9. A polymer of claim 7, wherein the acrylic or methacrylic nitrile is acrylonitrile or methacrylonitrile.

10. A polymer of claim 7, wherein the vinylidene monomers are styrene, vinyl acetate, acrylamide, N-methylol acrylamide, acrylic acid or methacrylic acid.

11. A polymer of claim 1 in an aqueous dispersion.

12. An aqueous dispersion of polymer of claim 11, wherein the lower alkyl acrylate is ethyl acrylate, n-butyl acrylate or 2-ethylhexyl acrylate; the acrylic or methacrylic nitrile is acrylonitrile or methacrylonitrile; and containing up to 40% by weight of one or more other polymerizable vinylidene monomers.

13. An aqueous dispersion of polymer of claim 12, wherein the polymerizable vinylidene monomers are acrylamide, N-methylol acrylamide, acrylic acid or styrene.

14. An aqueous dispersion of polymer of claim 13, wherein the polymer contains about 60 to 85% by weight lower alkyl acrylate, about 5 to 20% by weight of the acrylic or methacrylic nitrile, less than about 25% by weight other polymerizable vinylidene monomers, and about 3 to 30% by weight bis(β-chloroethyl)vinyl phosphonate.

References Cited

UNITED STATES PATENTS 2,888,434  5/1959  Shashoua _____ 260—45.5
3,316,123  4/1967  Savina et al. _____ 117—155

JOSEPH L. SCHOFER, Primary Examiner
S. M. LEVIN, Assistant Examiner

U.S. Cl. X.R.

117—124, 143, 152; 161—182; 260—80.71, 85.5